United States Patent
Yen et al.

(10) Patent No.: US 8,014,522 B2
(45) Date of Patent: Sep. 6, 2011

(54) OPTICAL STORAGE MEDIA AND THE CORRESPONDING CRYPTOGRAPHY FOR DATA ENCRYPTION THEREOF

(75) Inventors: Sheng Shun Yen, Chung Ho (TW); Wei Shen, Taipei (TW)

(73) Assignee: Wei Shen, Taipei (TW)

( * ) Notice: Subject to any disclaimer, the term of this patent is extended or adjusted under 35 U.S.C. 154(b) by 982 days.

(21) Appl. No.: 11/878,950

(22) Filed: Jul. 27, 2007

(65) Prior Publication Data
US 2008/0282094 A1    Nov. 13, 2008

(30) Foreign Application Priority Data
May 9, 2007    (TW) ................................ 96116406 A

(51) Int. Cl.
*H04L 9/00* (2006.01)
*G11B 27/36* (2006.01)
*G11B 7/24* (2006.01)
*G11B 23/03* (2006.01)

(52) U.S. Cl. ......................... 380/44; 369/53.21; 720/719

(58) Field of Classification Search ............ 369/53, 369/100, 53.21; 380/44–47; 720/719
See application file for complete search history.

(56) References Cited

U.S. PATENT DOCUMENTS

| | | | | |
|---|---|---|---|---|
| 5,400,319 | A * | 3/1995 | Fite et al. | 369/275.5 |
| 5,513,169 | A * | 4/1996 | Fite et al. | 720/718 |
| 5,661,703 | A * | 8/1997 | Moribe et al. | 369/14 |
| 5,706,047 | A * | 1/1998 | Lentz et al. | 347/262 |
| 5,930,215 | A * | 7/1999 | Fite et al. | 369/53.22 |
| 6,011,772 | A * | 1/2000 | Rollhaus et al. | 369/286 |
| 6,104,686 | A * | 8/2000 | Whitcher et al. | 369/111 |
| 6,338,933 | B1 * | 1/2002 | Lawandy et al. | 430/270.1 |
| 6,343,063 | B1 * | 1/2002 | Rollhaus et al. | 369/286 |
| 6,636,689 | B1 * | 10/2003 | Stebbings | 386/94 |
| 7,035,200 | B2 * | 4/2006 | Selinfreund et al. | 369/288 |
| 7,127,066 | B2 * | 10/2006 | Solomon et al. | 380/201 |
| 7,376,073 | B2 * | 5/2008 | Hart et al. | 369/275.5 |
| 7,486,790 | B1 * | 2/2009 | Selinfreund et al. | 380/201 |
| 7,644,273 | B1 * | 1/2010 | Stebbings | 713/168 |
| 7,660,415 | B2 * | 2/2010 | Selinfreund et al. | 380/201 |
| 2003/0081521 | A1 * | 5/2003 | Solomon et al. | 369/53.21 |
| 2003/0154376 | A1 * | 8/2003 | Hwangbo | 713/173 |
| 2006/0046011 | A1 * | 3/2006 | Kahlman et al. | 428/64.4 |
| 2007/0162982 | A1 * | 7/2007 | Staring et al. | 726/33 |

* cited by examiner

*Primary Examiner* — Christian LaForgia
(74) *Attorney, Agent, or Firm* — The Weintraub Group, P.L.C.

(57) ABSTRACT

Based on the demand of developing a data encryption technique for the optical storage media, the present invention discloses a cryptography for data encryption based on a design of specific hardware conditions, so as to achieve the security requirements for the encrypted digital data stored in the optical storage media and the design requirements for the security issues on the optical storage media for software vendors in the current market.

5 Claims, 6 Drawing Sheets

OPTICAL STORAGE MEDIA AND THE CORRESPONDING CRYPTOGRAPHY FOR DATA ENCRYPTION THEREOF

BACKGROUND OF THE INVENTION

1. Field of the Invention

The present invention relates to a data encryption methodology for the optical storage media, and more particularly, to a method for the arrangement of cryptography based on the characteristic of the Read Once/Un-reversible reaction technique. With the codes generated by such method, it is not possible to generate the accurate codes by just duplicating the conventional optical storage media as in the conventional technique. In addition, since such codes are generated based on the hardware's physical characteristic, it is not possible to crack or recover the original codes by using any software method.

2. Description of the Related Art

A DVD data protection technique using the encrypted keys is disclosed in U.S. Pat. No. 5,915,018. In the disclosed technique, two sets of encrypted key are used, wherein one set of keys is applied on another set of keys to re-encrypt the second set of keys, so as to obtain an encryption key, which is then written into the optical disk. Accordingly, the optical disk contains the media contents, encryption key and the corresponding decryption control information. Although the encrypted key had been re-encrypted, since the information required for decryption are all recorded in the optical disk, it is still possible to hack the contents of the optical disk.

The optical storage media is a hardware that stores data by using the optical characteristic, which includes Optical Disk (CD), Digital Versatile Disc (DVD), High Definition DVD (HDVD), Blue-ray DVD, or Magneto-Optical Disk, . . . etc. All of the optical storage media mentioned above are the digital data storage hardware that can read/write data from/to the media by using the optical characteristic.

In order to improve the data encryption security on the optical storage media, the author of the present invention discloses a cryptography for data encryption on the optical storage media and the apparatus thereof in the present invention based on many years of experience on electronic product development and research. The technical contents of the present invention are described in great detail hereinafter.

SUMMARY OF THE INVENTION

By using the Read Once/Un-reversible reaction material's characteristic, the present invention can arrange the storing location and attribute of the optical disk data and generate the melting code and developed code or the converse code and developed code by using such arrangement. Wherein, the former, i.e. the melting code or the converse code, may be stored inside the system after it had been read; and the latter, i.e. the developed code, is recorded in the optical storage media. Such two sets of codes that are stored separately in the optical storage media and in the host system can be applied on various data encryption/decryption processes in order to protect the copyright of the content stored in optical disk.

BRIEF DESCRIPTION OF THE DRAWINGS

The accompanying drawings are included to provide a further understanding of the invention, and are incorporated in and constitute a portion of this specification. The drawings illustrate embodiments of the invention, and together with the description, serve to explain the principles of the invention.

DETAILED DESCRIPTION OF THE PREFERRED EMBODIMENTS

Figure 1:
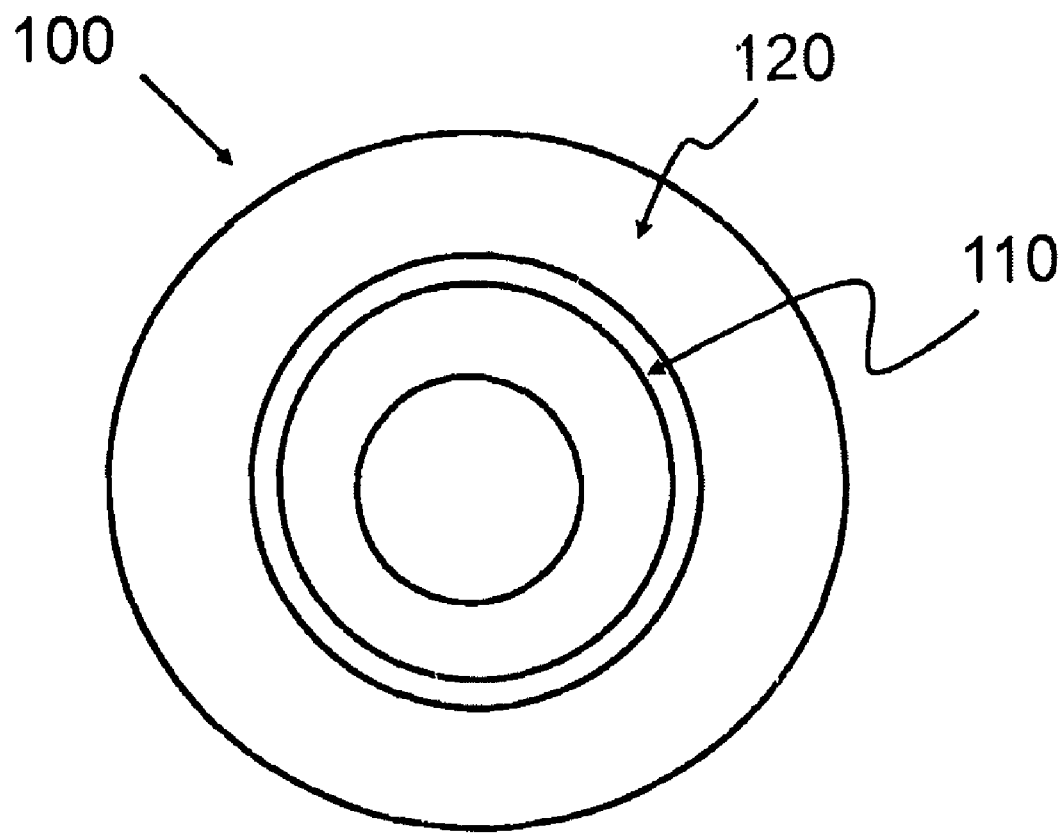
FIG. 1 schematically shows an optical storage media with Read Once/Un-reversible reaction cells according to a preferred embodiment of the present invention.
Figure 2:
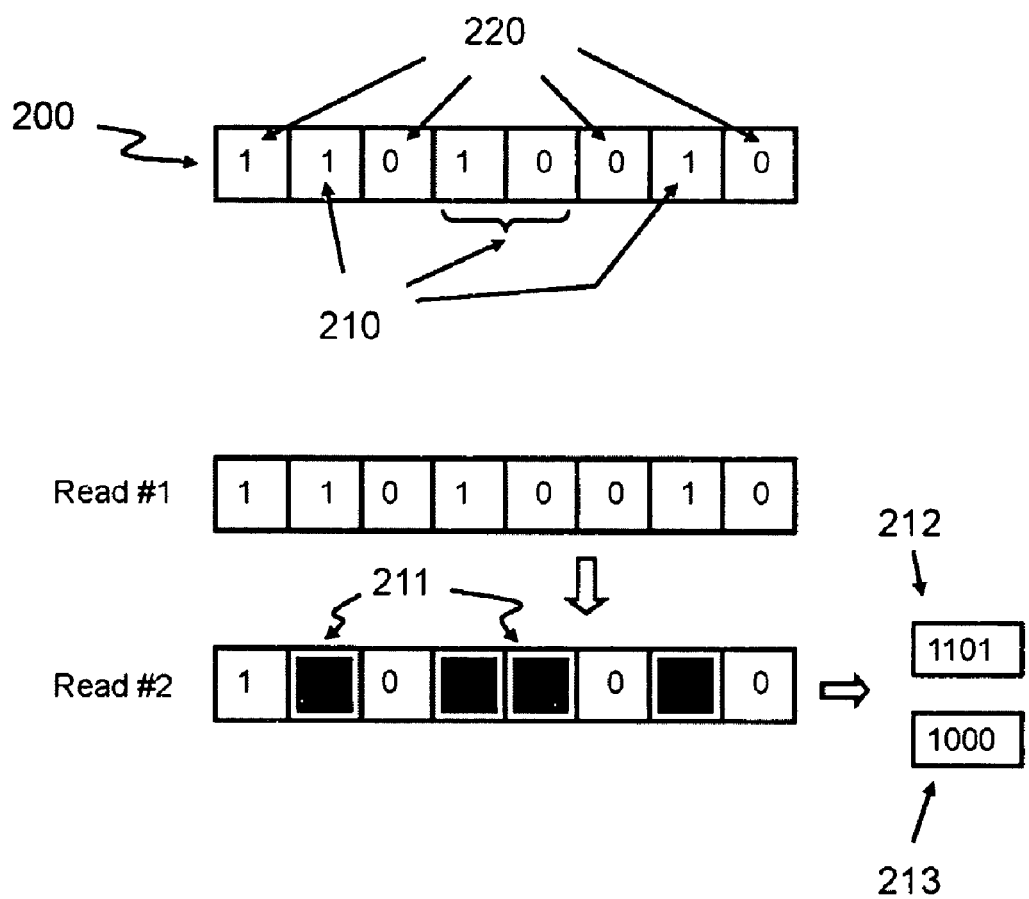
FIG. 2 is a schematic diagram showing how to generate a key pair for the disposable damaged material according to the present invention.

Refer to FIGS. 1 and 2 for the details of the embodiments provided by the present invention. FIG. 1 is a schematic diagram of an optical storage media (CD/DVD) according to the present invention, wherein a ring-shaped portion is used as a code area 110 to store codes, and the ring-shaped portion is a general data storage area 120 for storing media contents. For the operation principle of the optical storage media, please refer to FIG. 2 that schematically shows a detailed process of generating codes. FIG. 2 includes a code area 200, a Read Once/Un-reversible reaction cell 210, and a general reading cell 220. Wherein, the code area 200 is composed of a mix of the Read Once/Un-reversible reaction cell 210 and the general reading cell 220. The Read Once/Un-reversible reaction cell 210 is a cell with chemical material coated thereon. When data is read by a laser beam source, the cell's characteristic is changed and the data structure is changed accordingly. The encryption/description technique provided by the present invention is implemented by two processes based on different material-change characteristics, and its detail is described in great detail hereinafter.

I. If the Media is Made of Disposable Damaged Material

When the laser beam source is emitted on the material to read data, a chemical or physical reaction occurs on the material, which destroys the data structure, thus the data can be read only once. Therefore, after the Read Once/Un-reversible reaction cell 210 of FIG. 2 is first read by the laser beam, the cell 210 becomes a black cell 211 that cannot record or retain digital data anymore. Then, the data in the code area 200 obtained from the first reading operation is transmitted to a memory unit inside a host system (not shown) from an optical disk drive (not shown). Meanwhile, when the system reads the data a second time, since the black cell 211 does not contain any data at this moment, the system can only read the segment data 213, and a melting code 212 is generated by comparing the segment data 213 with the first reading data.

After the code area 200 is read for the first time, the laser beam reads the code area 200 a second time. Meanwhile, since the black cell 211 had been damaged, the data cannot be read. Then, the segment data 213 is formed in the code area 200, and the segment data 213 is in fact the code that was developed at the first data reading by the laser beam.

II. If the Media is Made of Disposable Reversed Material

Figure 3:
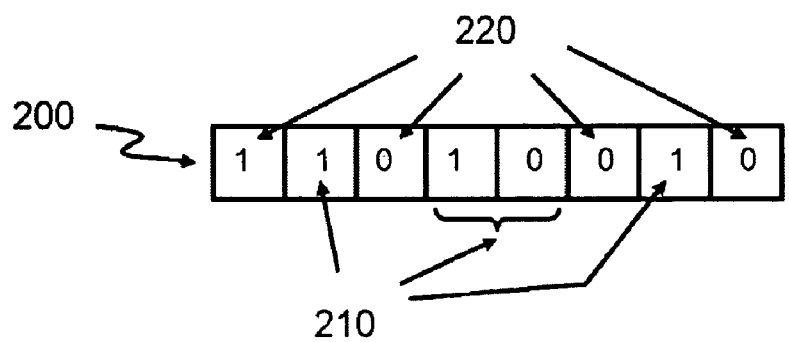
FIG. 3 is a schematic diagram showing how to generate a key pair for the disposable reversed material according to the present invention.
Figure 3:
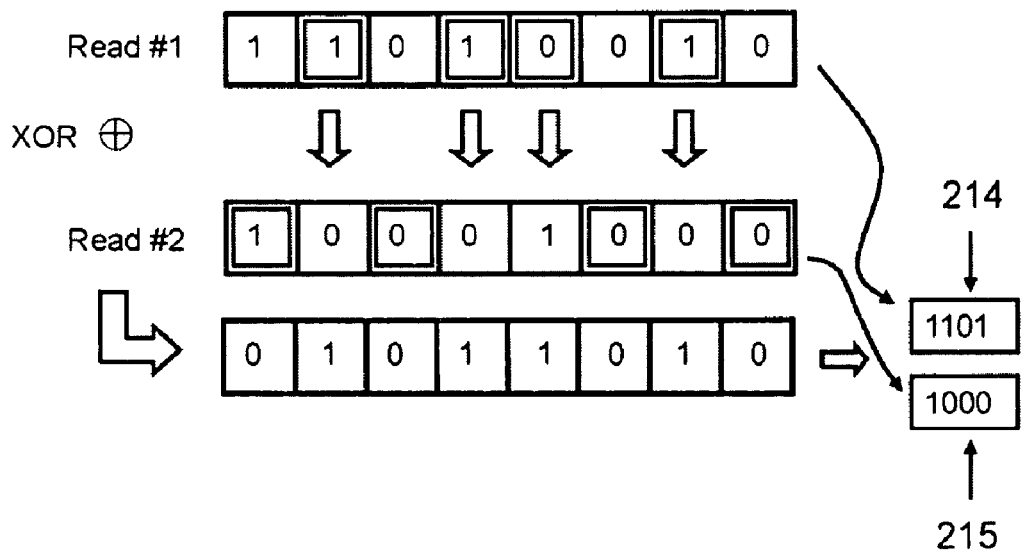

When the laser beam source is emitted on this material to read the data, such material reacts to reverse the data structure. Namely, the logic level of the change-once data is reversed, e.g. "logic 1" is reversed to "logic 0", and "logic 0" is reversed to "logic 1". Therefore, the initial data can be read only once. In the subsequent repeated multiple read operations, since the material reacts to the laser beam only once, only the reversed data can be read. Here, the original data before the change is called the initial data, and the data after the change is called the reversed data. Therefore, after the Read Once/Un-reversible reaction cell 210 was first read by the laser beam, the cell 210 changes to the reversed data and is permanently stored in the optical storage media. Referring to FIG. 3, the data that was first read from the code area 200 is transmitted to the memory unit of the host system from the optical disk drive. Afterwards, the system performs a second data reading on the code area 200. Since the data on the Read Once/Un-reversible reaction cell 210 had been reversed, after it had been read and compared with the first read data by the system, a converse code 214 is generated, for example, the converse code is generated from a XOR (Exclusive-OR) operation. While the converse code is being generated, another developed code 215 is also extracted by the system.

Figure 4:
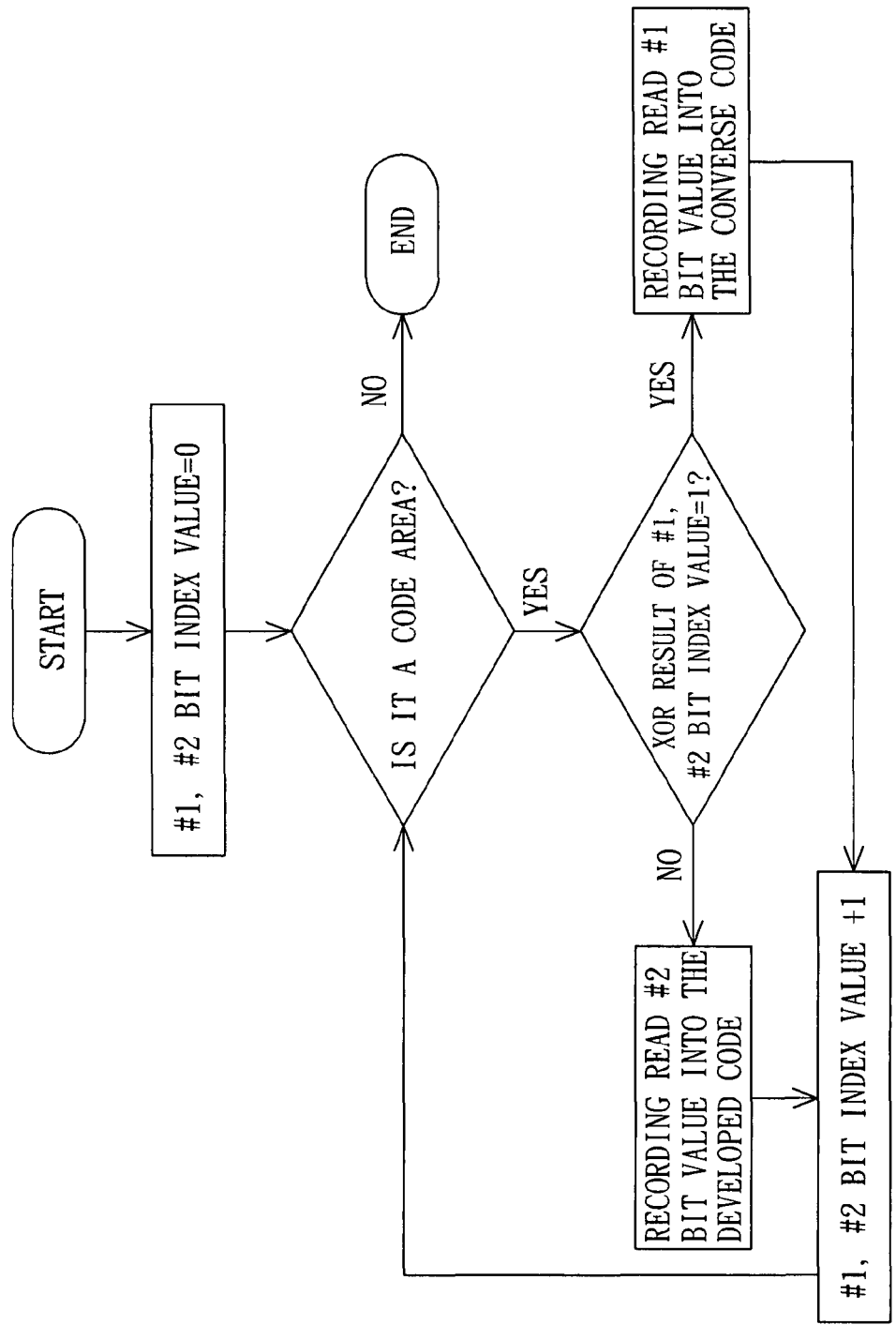
FIG. 4 is a flow chart illustrating a method of generating the converse and developed codes according to the present invention.

FIG. 4 is a flow chart illustrating a method of generating the converse and developed codes according to the present invention. As shown in the drawing, first, the bit index values of the first read data (referred as Read # 1 hereinafter) and the second read data (referred as Read #2 hereinafter) are set to 0. Here, the index values indicate the bit location of the Read #1 and Read #2. Then, it is checked if the bit is an area code bit. If it is not, the process is terminated. Otherwise, a XOR operation is applied on the bits of the Read #1 and Read #2. If the operation result is 1, the Read #1 bit is a converse code bit, and it will be recorded in the converse code. If the operation result is 0, the Read #2 bit is a developed code bit, and it will be recorded in the developed code. With such method, a converse code and a developed code are generated. Then, the bit index value of Read #1 and Read #2 are incremented by 1. Afterwards, it is reconfirmed that the bit still belongs to the code area, and the previous steps are repeated continuously until all bits in the code area are read out and compared, and the process is finished. By following the flows shown in FIG. 4, the converse code and the developed code are completely extracted.

Two codes are generated from the aforementioned processes. Wherein, the former code is the melting code 212 and the developed code 213 which are generated based on the material's un-reversible damaged characteristic, and the developed code is permanently recorded and retained on the optical disk. The latter code is the converse code 214 and the developed code 215 which are generated based on the material's disposable permanently reversed characteristic. Since the latter material has a disposable permanently reversed characteristic, once the data logic level is reversed, it cannot be changed anymore, and the converse code 214 and the developed code 215 are both recorded on the optical storage media. Therefore, for the host system which lacks the converse code 214, it is not possible to effectively recognize the developed code 215 from the optical storage media. Accordingly, this encryption/decryption process is different from the previous process, which uses the material's un-reversible damaged characteristic.

It is known from the description mentioned above, the melting code 212 and the developed code 213 generated by the formal process and the converse code 214 and the developed code 215 generated by the latter process are respectively stored in the host memory system and the optical storage media 100 based on its specific characteristic. Therefore, these two codes (212,213) or (214,215) can be used by the content provider to encrypt and decrypt the media contents through appropriate arrangement.

An example is provided herein to explain the operation principle of the present invention. The algorithm of a public key cryptography operation complying with an asymmetric public key infrastructure is represented as:

$$\begin{cases} E^{Kp\ 1}[M] = C & \cdots \text{ (Equation 1)}; \\ D^{Kp-1}[C] = M & \cdots \text{ (Equation 2)}; \end{cases}$$

or $$\begin{cases} E^{Kp-1}[M] = C & \cdots \text{ (Equation 3)}; \\ D^{Kp\ 1}[C] = M & \cdots \text{ (Equation 4)}; \end{cases}$$

where E represents encrypt, D represents decrypt, Kp1 represents a public key, Kp-1 represents a private key, M represents a plaintext, i.e. the initial data, and C represents the encrypted content.

Through appropriate design, the private key Kp-1 and the public key Kp1 used in the public key cryptography operation can be obtained from the aforementioned melting code 212 and the developed code 213 or the converse code 214 and the developed code 215 to encrypt or decrypt the optical disk contents. In other words, the content vendor first uses the public key Kp1 to encrypt and convert the plaintext to the encrypted content (Equation 1), and then records the encrypted content and the code area 200 onto the optical disk. After the optical disk is first read and the private key Kp-1 is obtained, the encrypted content is decrypted by the host system (Equation 2), and the data encoding/decoding process is completed. In addition, after the data is first read by the laser beam source, only the public key Kp1 remains on the optical disc and it is not possible to obtain the private key Kp-1 from the optical disk, which effectively secures the data stored in the optical disk. Even if the optical disk is moved to another host system, the content of the optical disk cannot be reached due to the lacking of the private key Kp-1.

The technique provided by the present invention effectively protects the contents of the optical disk from being illegally replicated. When the optical storage media 100 of the present invention is first read, even if the digital data had been duplicated to the conventional optical disk, since the conventional optical disk lacks the Read Once/Un-reversible reaction cell, it is not possible to generate the melting code 212 and the developed code 213 or the converse code 214 and the developed code 215, and the encrypted data stored in the optical disk cannot be decoded.

Figure 5:
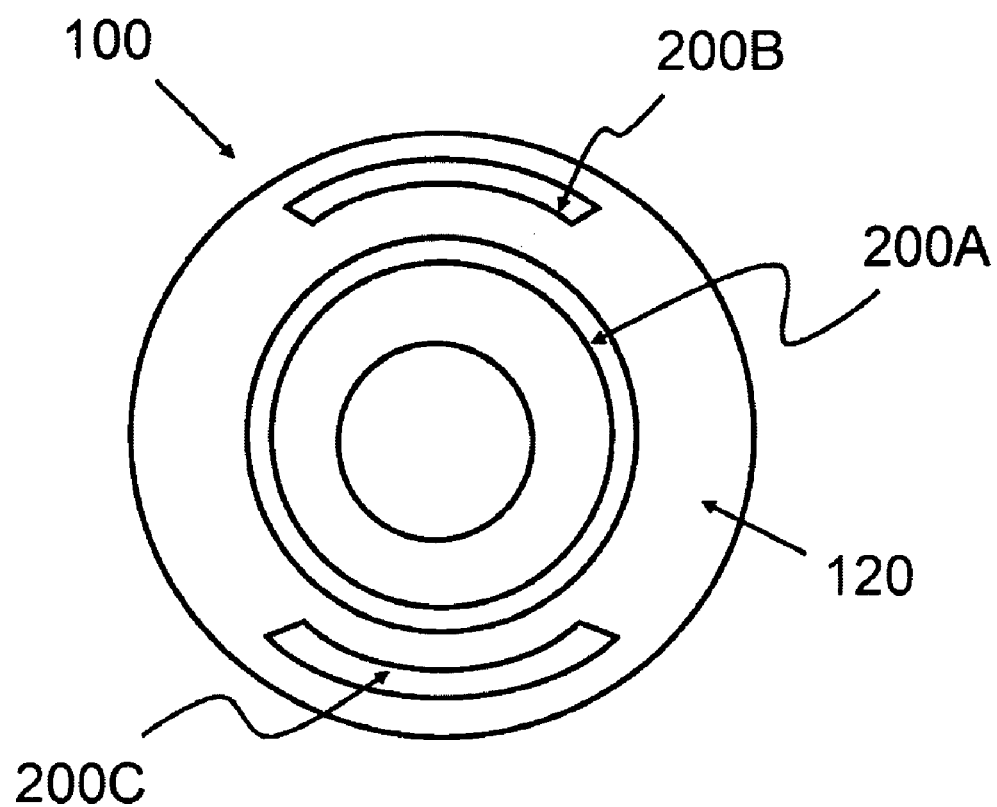
FIG. 5 is a schematic diagram of an optical storage media with a plurality of code areas according to the present invention.

Referring to FIG. 1, the code area 110 shown in FIG. 1 may be a ring-shaped portion, which is also the code area 200 for storing the codes in FIG. 2. For the software product which can be repeatedly operated in various host systems, the quantity of the code area 200 on the optical storage media 100 can be appropriately increased. Referring to FIG. 5, which shows an optical storage media 100 with a plurality of code areas (i.e. the melting code and the developed code or the converse code and the developed code) 200A, 200B and 200C. In addition, different public and private keys are stored in every area, and the public and private keys together form a key pair, such that the software product can be installed on three different host systems by the user. In consideration of different product and customer requirements, the software vendor can select an appropriate optical disk format to record its software product on the optical disk without having to worry about the illegal replication of the optical disk content, thus the data stored in the optical disk is effectively secured. The structure shown in FIG. 5 provides a plurality of key pairs. Accordingly, different key pairs can be applied on the digital signature mechanism to authenticate the user and vendor ID, such that the transaction is ensured to be secured. If the data is re-encrypted, the uniqueness of the data can be further ensured, that is to ensure the data does not suffer from malicious modification operations such as delete, change, add and edit during the data transmission and transportation.

Figure 6:
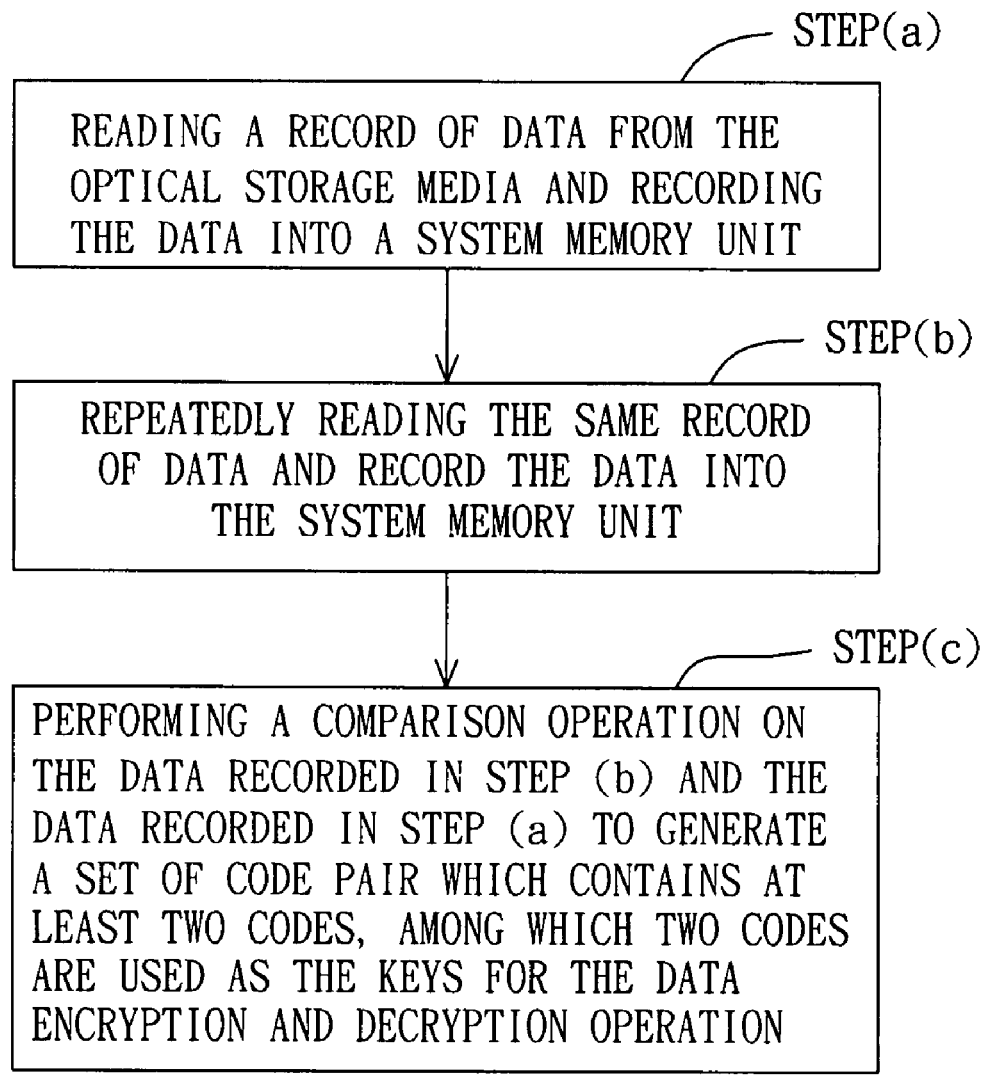
FIG. 6 is a flow chart illustrating a data processing method for the optical storage media according to the present invention.

In addition, the present invention further provides a data processing method for the optical storage media. FIG. 6 shows a flow chart of a data processing method for the optical storage media according to the present invention. As shown in the drawing, the data processing method for the optical storage media of the present invention comprises the following steps: (a) reading a record of data from the optical storage media 100 and recording the data into a system memory unit; (b) repeatedly reading the same record of data and record the data into the system memory unit; and (c) performing a comparison operation on the data recorded in step (b) and the data recorded in step (a) to generate a set of code pairs which contains at least two codes, among which two codes are used as the keys for the data encryption and decryption operation.

In step (a), a record of data stored in the optical storage media 100 is read and stored in the system memory unit.

In step (b), the same record of data is read and recorded in the system memory unit. Wherein, the technique details related to steps (a)~(b) are described in the previous embodiment, thus it is intentionally omitted herein.

In step (c), the data recorded in step (b) is compared with the data recorded in step (a) to generate a set of code pairs which contains at least two codes, among which two codes are used as the keys for the data encryption and decryption operation. Please refer to the aforementioned equations (1)~(4) and its related description for the technical details of this operation.

In addition, the operation in the comparison process includes, but does not limit to a XOR (Exclusive-OR) operation. Wherein, two keys are used as a public key and a private key, respectively. The operation includes, but does not limit to an asymmetric encryption/decryption technique. Additionally, the asymmetric encryption/decryption technique includes, but does not limit to a public key infrastructure, in which one public key and one private key are used as the passwords of the user ID authentication operation.

In summary, in order to improve the data security of the optical storage media, the most effective design is to combine the optical disk's data design and material application. Based on this principle, the present invention designs an optical storage mechanism with a high level of security. In the present invention, the hardware mechanism for the reading operation in the optical disk drive is not largely changed, instead, the objective of data protection is achieved by merely modifying the optical storage media's material and data design. Furthermore, the present invention effectively prevents the optical disk contents from being illegally replicated as in the prior technique, thus the objective of data protection for the optical storage media is achieved.

Although the invention has been described with reference to a particular embodiment thereof, it will be apparent to one of the ordinary skills in the art that modifications to the described embodiment may be made without departing from the spirit of the invention. Accordingly, the scope of the invention will be defined by the attached claims not by the above detailed description.

What is claimed is:

1. A data processing method for an optical storage media, comprising:
   (a) reading a record of data from said optical storage media and recording said data on a system memory unit;
   (b) repeatedly reading said same record of data and recording said data on said system memory unit; and
   (c) performing a comparison operation on said data recorded in said step (b) and said data recorded in said step (a) to generate a set of code pairs containing at least two codes, among which two codes are used as two encryption/decryption keys in a data encryption/decryption operation.

2. The data processing method for the optical storage media of claim 1, wherein said comparison operation comprises a XOR (Exclusive-OR) operation.

3. The data processing method for the optical storage media of claim 1, wherein said two encryption/decryption keys are respectively used as a public key and a private key in an asymmetric encryption/decryption technique operation.

4. The data processing method for the optical storage media of claim 3, wherein said asymmetric encryption/decryption technique is a public key infrastructure technique.

5. The data processing method for the optical storage media of claim 3, wherein one public key and one private key are used as passwords of a user ID authentication operation.

* * * * *